United States Patent

Sanford, Jr.

[11] Patent Number: 5,879,071
[45] Date of Patent: Mar. 9, 1999

[54] LIGHTED PLANTER

[76] Inventor: Sammie J. Sanford, Jr., 24034 Rosewood, Oak Park, Mich. 48237

[21] Appl. No.: 806,862

[22] Filed: Feb. 27, 1997

[51] Int. Cl.[6] .............................. F21V 7/04; F21V 33/00; F21P 1/02
[52] U.S. Cl. .................. 362/154; 362/101; 362/122; 362/152; 362/249; 362/252; 362/253; 362/412; 362/805; 362/806; 362/807; 362/562; 362/563; 362/565; 362/566
[58] Field of Search ............................ 362/32, 101, 122, 362/154, 805, 123, 806, 807, 800, 132, 134, 152, 155, 156, 190, 209, 249, 252, 253, 412, 432, 809, 551, 554, 559, 562, 563, 564, 565, 576, 581

[56] References Cited

U.S. PATENT DOCUMENTS

| | | | |
|---|---|---|---|
| 1,215,986 | 2/1917 | Pohlman | 362/154 |
| 1,579,649 | 4/1926 | Cushway | 362/123 |
| 1,613,759 | 1/1927 | Loftin | 362/154 |
| 1,742,212 | 1/1930 | Muldoon | 362/134 |
| 1,758,130 | 5/1930 | Shoemaker | 362/101 |
| 1,762,383 | 6/1930 | Booraem | 362/101 |
| 1,909,404 | 5/1933 | Horn | 362/101 |
| 2,192,820 | 3/1940 | Taylor | 362/155 |
| 2,559,313 | 7/1951 | Nordstrom | 362/154 |
| 2,604,579 | 7/1952 | Deneboudes | 362/101 |
| 2,720,056 | 10/1955 | Levy | 47/41.01 |
| 2,723,341 | 11/1955 | Greenspan | 362/154 |
| 2,810,820 | 10/1957 | Nelson | 362/132 |
| 2,815,607 | 12/1957 | Schroader | 362/32 |
| 3,500,036 | 3/1970 | Szentveri | 362/152 |
| 3,609,342 | 9/1971 | Wisniewski | 362/156 |
| 3,735,113 | 5/1973 | Stott . | |
| 4,120,025 | 10/1978 | Deaven | 362/153 |
| 4,530,036 | 7/1985 | Conti | 362/32 |
| 4,594,646 | 6/1986 | Von Kohorn et al. | 362/101 |
| 4,626,968 | 12/1986 | Von Kohorn | 362/122 |
| 4,630,177 | 12/1986 | Von Kohorn et al. | 362/32 |
| 4,646,209 | 2/1987 | Jansen | 362/122 |
| 4,672,513 | 6/1987 | Von Kohorn et al. | 362/32 |
| 4,847,736 | 7/1989 | Ho | 362/122 |
| 4,858,085 | 8/1989 | Von Kohorn | 362/122 |
| 4,886,183 | 12/1989 | Fleming . | |
| 5,044,509 | 9/1991 | Petrosky et al. | 215/366 |
| 5,070,435 | 12/1991 | Weller | 362/101 |
| 5,119,279 | 6/1992 | Makowsky | 362/101 |
| 5,171,081 | 12/1992 | Pita et al. | 362/34 |
| 5,263,209 | 11/1993 | Pattee | 4/661 |
| 5,355,289 | 10/1994 | Krenn | 362/253 |
| 5,664,879 | 9/1997 | Lai | 362/392 |
| 5,741,061 | 4/1998 | Lehmann et al. | 362/154 |

FOREIGN PATENT DOCUMENTS

| | | | |
|---|---|---|---|
| 865980 | 6/1941 | France | 362/101 |
| 1027804 | 2/1953 | France | 362/412 |
| 1058154 | 11/1953 | France | 362/806 |
| 1325746 | 3/1963 | France | 362/805 |
| 2 608 891 | 7/1988 | France . | |
| 2 688 648 | 9/1993 | France . | |
| 8-99 | 1/1996 | Japan . | |
| 164660 | 10/1933 | Switzerland | 362/101 |
| 1142697 | 2/1985 | U.S.S.R. | 362/101 |
| 2 153 061 | 8/1985 | United Kingdom | 362/806 |
| 2 230 684 | 10/1990 | United Kingdom . | |

*Primary Examiner*—Ira S. Lazarus
*Assistant Examiner*—Ljiljana V. Ciric
*Attorney, Agent, or Firm*—Fildes & Outland, P.C.

[57] ABSTRACT

A lighted planter includes a container having a bottom and side walls and an opening formed by the walls and spaced from the bottom wall. The side walls include a generally horizontally extending edge portion adjacent the opening and a light source integral with the edge portion providing upwardly projecting illumination to directly light a plant planted therein.

9 Claims, 1 Drawing Sheet

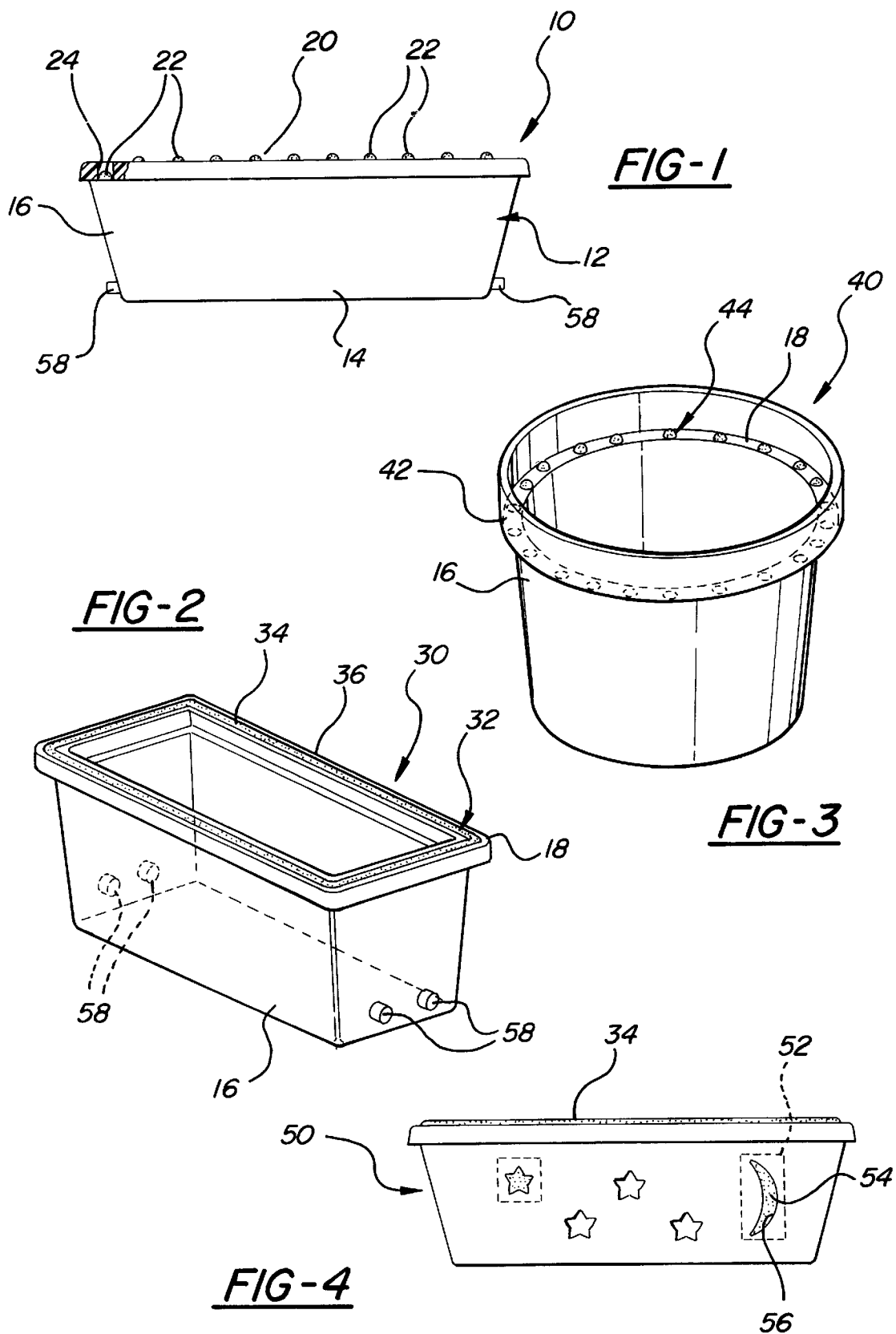

LIGHTED PLANTER

FIELD OF THE INVENTION

This invention relates to decorative lighting of a planter and more specifically to a lighted planter having a lighted edge for illuminating a plant therein.

BACKGROUND OF THE INVENTION

It is known in the art relating to lighting a plant to provide a light source, such as a spotlight, track lighting, or other artificial lighting means, independent of a planter or container for the plant, for illuminating the plant. While this lighting does an effective job of illuminating the plant, this method requires a light source independent of the planter and the problems associated with location and expense.

It is also known to provide planters or flower pots with indirect lighting means for centripetally lighting a plant therein. The construction of these planters is complicated and relatively expensive.

SUMMARY OF THE INVENTION

The present invention provides a planter or plant container having a means for directly lighting a plant therein.

The present invention also provides a planter having a high degree of ornamental and decorative value, which is simple in construction, economical to manufacture and durable in service.

In carrying out the advantages of the invention, the planter includes a container having a bottom and side walls. The side walls define an opening spaced from the bottom wall for receiving planting material and a plant therein. The side walls include a generally horizontally extending edge portion adjacent opening near the top of the planter. A light source, integral with the edge portion provides upwardly projecting illumination for directly lighting a plant planted in the planter.

In one embodiment of the invention, the light source is a plurality of incandescent light assemblies disposed around the edge portion. In another embodiment of the invention, the light source is a fiber optic light assembly disposed on the upper surface of the edge portion. Alternatively, the fiber optic light assembly can be molded into the edge portion.

Preferably the edge portion extends outwardly from the side walls and the planter includes upper walls extending upwardly from the outer perimeter of the edge portion whereby the light source illuminates an area inside the upper walls.

In an alternative embodiment, the planter includes a receptacle or receptacles in the side walls for receiving another light source or sources, and an opening in the receptacle or receptacles and defined in part by the side walls allowing light to pass therethrough. The opening can be shaped to a desired shape and lighted by known lighting means. As another variation, side light assemblies can be mounted on the outside of the side walls for decorative effect.

These and other features and advantages of the invention will be more fully understood from the following detailed description of the invention taken together with the accompanying drawings.

BRIEF DESCRIPTION OF THE DRAWING

In the drawings:

FIG. 1 is a side view of a lighted planter constructed in accordance with the present invention;

FIG. 2 is a perspective view of a lighted planter constructed in accordance with another embodiment of the present invention;

FIG. 3 is a perspective view of a lighted planter constructed in accordance with another embodiment of the present invention; and FIG. 4 is an side view of a lighted planter constructed in accordance with yet another embodiment of the present invention.

DETAILED DESCRIPTION OF THE INVENTION

Referring now to the drawings in detail, numeral 10 generally indicates a lighted planter including an integral light source for directly lighting a plant planted therein. As is hereinafter more fully described, the lighted planter has a high degree of ornamental and decorative value, is simple in construction, economical to manufacture and durable in service.

With reference to FIG. 1, the planter 10 includes a container 12 having a bottom 14 and side walls 16. The side walls 16 define an upwardly facing opening spaced from the bottom wall 14 for receiving planting material and a plant therein. The side walls 16 include a generally horizontally extending edge portion 18, herein an outwardly extending flange having an outer perimeter, adjacent the opening near the top of the planter. A light source 20 defined by a plurality of incandescent lighting assemblies 22 of known construction, is fixed to the edge portion 18 and provides upwardly projecting illumination for directly lighting a plant planted in the planter 10.

Preferably, the planter 10 is molded out of plastic which provides a durable low cost construction and allows for the use of an infinite number of colors. The incandescent lighting assemblies 22 can be molded into the edge portion 18 during manufacture, affixed to the edge portion by bonding or mechanically fastened to the edge portion. Electrical wiring for the light assemblies 22 can be hidden under the edge portion 18 or preferably molded into the edge portion 18. Power supplied to the light assemblies 22 depends on the lights used. To provide for shaping of the projected light, apertures 24 can be formed into the edge portion 18 and the light source disposed below the edge whereby the light projected upwardly is shaped by the configuration of the apertures.

In another embodiment of the invention illustrated in FIG. 2, planter 30, includes a light source 32 defined by a fiber optic light assembly 34. The fiber optic assembly 34 includes a fiber optic string 33, lighting means 35 for providing light rays through said fiber optic string 33 and a box 37 encasing the lighting means 35 connected to the fiber optic string 34. The lighting means 35 can be a quartz halogen or a metal halide. The fiber optic string 33 is mounted on the upper surface 36 of the edge portion 18.

As is illustrated, in the preferred constructions, the edge portion 18 extends outwardly from the side walls 16. In an alternative embodiment shown in FIG. 3, a planter 40 includes upper walls 42 extending upwardly from the outer perimeter of the edge portion 18 and molded integrally therewith. In this embodiment the light source 44, which can be an incandescent or fiber optic light assembly, illuminates an area inside and above the upper walls 42.

In yet an alternative embodiment illustrated in FIG. 4, a planter 50 includes a receptacle 52 or receptacles in the side walls 16 for receiving another light source 54 or sources, and an opening 56 in the receptacle or receptacles and defined in part by the side walls 16 allowing light to pass therethrough. The opening 56 can be shaped to any desired shape and lighted by known lighting means. As another variation to this side lighting arrangement, side light assemblies 58 can be mounted on the outside of the side walls 16 as shown in FIGS. 1 and 2 for decorative effect.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A lighted planter comprising:

bottom and side walls, said planter also having an opening defined by said side walls and spaced from said bottom wall, said side walls supporting a horizontally disposed edge portion adjacent and extending outwardly from said opening, said edge portion including an upwardly facing horizontal surface around the entire circumference of said opening; and a light source directly mounted on said upwardly facing horizontal surface, said light source providing upwardly projecting illumination around the entirety of said opening.

2. The planter of claim 1 wherein said light source is a plurality of incandescent light assemblies.

3. The planter of claim 1 wherein said light source is a fiber optic light assembly including a fiber optic string, lighting means for providing light rays through said fiber optic string and a box encasing the lighting means connected to the fiber optic string.

4. The planter of claim 3 wherein said fiber optic string is molded into said edge portion.

5. The planter of claim 1 wherein said edge portion extends outwardly from said side walls.

6. The planter of claim 5 wherein said edge portion includes apertures therein and said light source is disposed to project light through said apertures.

7. The planter of claim 5 further including upper walls extending upwardly from an outer perimeter of said edge portion whereby said light source illuminates an area surrounded by said upper walls.

8. The planter of claim 1 including a receptacle in said side walls for receiving an additional light source, and an opening in said receptacle and defined in part by said side walls allowing light to pass through said opening in the receptacle.

9. The planter of claim 1 including side light assemblies mounted on said side walls.

* * * * *